Aug. 15, 1961     S. W. ALDERSON     2,995,832
TRAINING AID FOR INTRAVENOUS THERAPY
Filed Aug. 1, 1960     2 Sheets-Sheet 1
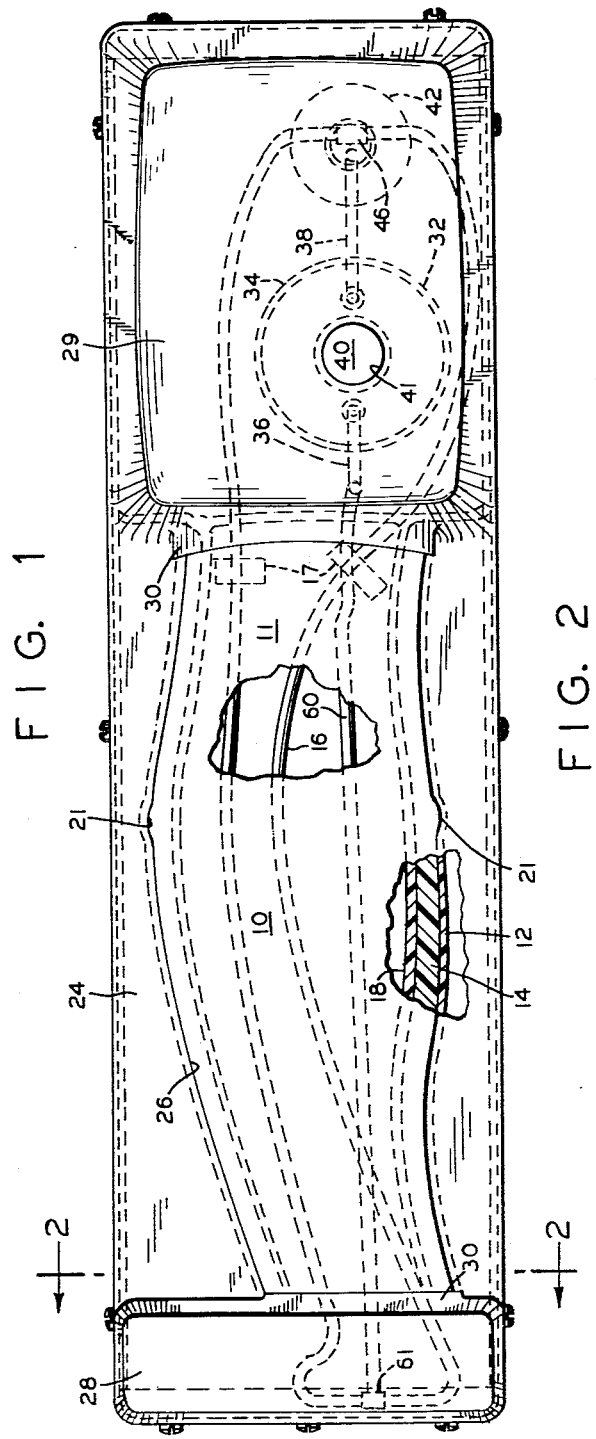
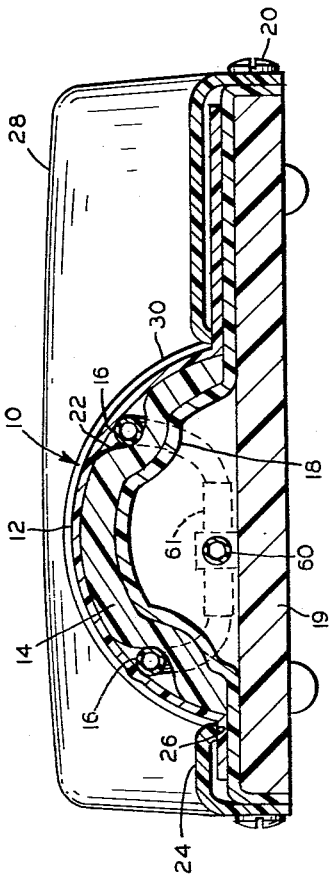
*INVENTOR.*
SAMUEL W. ALDERSON
BY John P. Chandler
HIS ATTORNEY.

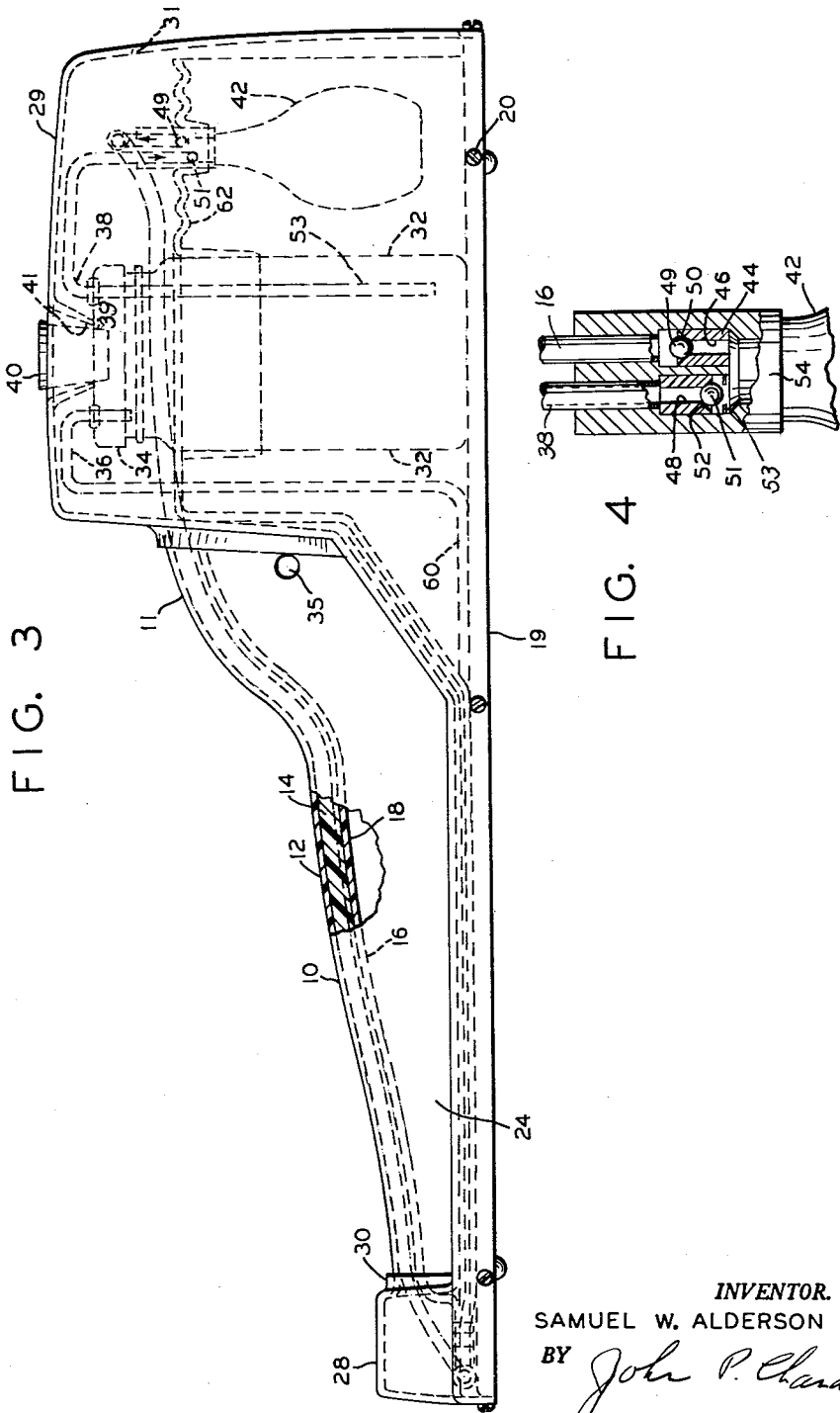

United States Patent Office

2,995,832
Patented Aug. 15, 1961

2,995,832
TRAINING AID FOR INTRAVENOUS THERAPY
Samuel W. Alderson, New York, N.Y., assignor to Alderson Research Laboratories, Inc., Long Island City, N.Y., a corporation of New York
Filed Aug. 1, 1960, Ser. No. 46,833
3 Claims. (Cl. 35—17)

This invention relates to a training device for teaching vein-puncture techniques and has for its principal object the provision of an improved apparatus which closely simulates the actual member of the human body, such as the arm, and which is provided with "veins" and a system for circulating simulated blood through these veins in such a manner that it will not be subject to sticking and clogging which was one of the principal difficulties inherent in devices of the prior art.

Another object of the invention is to provide a simulated body member having adequate realism with respect to both appearance and feel of the skin, veins, underlying tissue and bones as to closely duplicate the problem of locating the vein and puncturing it with a hypodermic syringe for training purposes.

A further object of the invention is to provide a training device for intravenous injection technique which will permit the simulated vein which has served its usefulness through repeated puncturing to be readily removed from the apparatus and a new one inserted in its place.

In the drawing:

FIG. 1 is a plan view of the apparatus, parts being broken away to show the internal arrangement.

FIG. 2 is a transverse section taken on line 2—2 of FIG. 1.

FIG. 3 is a front elevation, partially in section.

FIG. 4 is an enlarged broken section of the valve system in the bottle top.

The apparatus of the present invention comprise a simulated lower arm section 10 and an upper arm section 11. These arm sections include an outer "skin" 12 which is formed preferably from a sheet of vinyl plastic material duplicating in color and texture the anterior surfaces of the forearm and upper arm. Underlying this outer skin is a layer 14 of somewhat thicker material forming the "flash." This layer is preferably made from foam vinyl plastic.

The "veins" 16 are made from gum rubber tubing and are anchored between the flesh and the skin as by means of short length of pressure sensitive adhesive tape as shown at 17. The arm simulation rests upon an elongated inner structural member or housing 18 made of a vacuum-formed plastic which is semi-rigid. This sheet and the outer sheet is secured around its margins to a flat baseboard 19 by means of screws 20. This inner housing or shell 18 is outwardly flared at the elbow region as shown at 21 (FIG. 1) to provide the feel of the epicondycles and is further formed with grooves 22 along the path of the vein tubes so that the latter are depressed into the flesh surface, thus requiring that the vein be "rolled" against the flesh by the trainee in order to locate them. As will be seen in FIG. 2 the depth of groove 22 is about the same as the diameter of tubes 16.

There is also an outer housing which may similarly be a vacuum-formed sheet of plastic and it includes a shallow section 24 having a cut-out 26 to expose the working surfaces of the arm. At its lower end, i.e., the end where the human hand would be, this outer housing has a slightly raised section 28 enclosing the ends of the vein tubes and the opposite end has a higher raised section 29 which forms an enclosure for the pumping system. The end sections 28 and 29 have marginal flanges 30 which engages the opposed ends of skin layer 12 and secure these terminals in place.

Access to the interior of housing section 29 is through an end wall opening 31 and the pumping system and "blood" supply reservoir includes a bottle 32 having a closure cap 34 which has openings for tubes 36 and 38. The closure cap further has a central filling opening 39 to receive a stopper 40. Housing 29 also has an opening through which the stopper passes so that bottle 32 can be filled from outside housing 29. This opening is defined by a vacuum formed collar 41 which bears against the cap and holds the bottle in place. The pressurizing mechanism of the pump assembly is a bulb 42 having a fitting 54 enclosing an adaptor 44 containing two ports 46 and 48 and directed oppositely with respect to the bulb. Port 46 has a ball valve 49 seated at its lower end 50 and port 48 has a ball valve 51 seated at its upper end 52. A stop 53 limits downward travel of ball 51. Port 46 is connected with vein tubes 16 and port 48 is connected with tube 38 leading to a supply pipe 53 extending through bottle cap 34 and down substantially to the lower end of the bottle. Tube 36, also extends through the bottle cap and extends down only slightly below the cap. This tube is connected with a tube 60 leading to a T-fitting 61 connected with vein tubes 16.

The rubber bulb is rigidly mounted in an opening into upper wall 62 of inner housing 18 which is shown as being ribbed to afford stiffening. A further aid to heighten the realism of the device is to form a through opening 35 shown in FIG. 3 through which a tourniquet may pass and be suitably tied above the arm.

The operation of the device is as follows: After the bottle is filled with simulated blood, the bulb is squeezed, causing air to flow out through the veins 16, and back through connecting bloodline 60, into the bottle through fitting 36. Air cannot flow during this time from the bulb through the other port 48 and through tube 38 into the bottle because of the opposing, closed ball-check valve 52. As a result, the bottle becomes pressurized.

When the bulb is released, air pressure in the bottle, acting upon the surface of the blood forces it through tube 53 and into the bulb. At this time, air cannot return to the bulb through veins 16 because the ball-check valve 52 in the path is now closed. Several applications of pressure to the bulb cause blood to enter the bulb and then to flow down through the veins, making a complete circuit under as much air pressure as the operator wishes to provide. Thereafter, the trainee is able to withdraw blood or to inject other fluids by locating the veins with his fingers and then inserting a hypodermic syringe.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. An intravenous therapy training aid including a simulated section of the human body and formed with superimposed layers including an outer skin of flexible material, a relatively rigid inner layer and an intermediate layer of soft material, tubes forming simulated veins between the intermediate and outer layers, a simulated blood supply reservoir, a pressurizing bulb provided with a duct leading to the bottom of the reservoir and a check valve arranged to close when the bulb is pressurized and a duct leading to the one end of the vein tubes and having a check valve arranged to open when the bulb is pressurized, a duct connecting the vein tubes with the upper end of the reservoir whereby pressurizing of the bulb creates pressure in the vein tubes and the reservoir and drives the simulated blood into the bulb and thence into the vein tube.

2. An intravenous therapy training aid including a simulated section of the human body such as an arm or leg and formed with superimposed layers including an outer skin of flexible plastic material, an inner layer of relatively rigid, vacuum formed plastic, and an intermediate layer of foam plastic material, rubber tubes forming simulated veins between the two outer layers, a simulated blood supply reservoir, a pressurizing bulb provided with a duct leading to the bottom of the reservoir and a check valve arranged to close when the bulb is pressurized and a duct leading to the one end of the vein tubes and having a check valve arranged to open when the bulb is pressurized, a duct connecting the vein tubes with the upper end of the reservoir whereby pressurizing of the bulb creates pressure in the vein tubes and the reservoir and drives the simulated blood into the bulb and thence into the vein tube.

3. An intravenous therapy training aid including a simulated section of the human body and formed with superimposed layers including an outer skin of flexible plastic material, an inner layer of relatively rigid plastic, and an intermediate layer of foam plastic material, rubber tubes forming simulated veins between the two outer layers, a simulated blood supply reservoir, a pressurizing bulb provided with a duct leading to the bottom of the reservoir and a check valve arranged to close when the bulb is pressurized and a duct leading to the one end of the vein tubes and having a check valve arranged to open when the bulb is pressurized, a duct connecting the vein tubes with the upper end of the reservoir whereby pressurizing of the bulb creates pressure in the vein tubes and the reservoir and drives the simulated blood into the bulb and thence into the vein tube.

References Cited in the file of this patent

UNITED STATES PATENTS

| | | |
|---|---|---|
| 2,704,897 | Lade | Mar. 29, 1955 |
| 2,871,579 | Niiranen et al. | Feb. 3, 1959 |
| 2,871,584 | Poole | Feb. 3, 1959 |